United States Patent
Havaldar et al.

(10) Patent No.: US 10,893,012 B2
(45) Date of Patent: Jan. 12, 2021

(54) CONTEXT AWARE METADATA-BASED CHAT WIZARD

(71) Applicant: ADP, LLC, Roseland, NJ (US)

(72) Inventors: Sachin Havaldar, Chertsey-Surrey (GB); Aravind Sundar, Bristol (GB)

(73) Assignee: ADP, LLC, Roseland, NJ (US)

( * ) Notice: Subject to any disclaimer, the term of this patent is extended or adjusted under 35 U.S.C. 154(b) by 297 days.

(21) Appl. No.: 15/961,673

(22) Filed: Apr. 24, 2018

(65) Prior Publication Data

US 2019/0327199 A1 Oct. 24, 2019

(51) Int. Cl.

| | |
|---|---|
| *G06Q 10/10* | (2012.01) |
| *G06Q 10/00* | (2012.01) |
| *G06Q 10/08* | (2012.01) |
| *G06Q 30/02* | (2012.01) |
| *G06Q 30/08* | (2012.01) |
| *H04L 12/58* | (2006.01) |
| *G06F 8/41* | (2018.01) |
| *G06Q 10/06* | (2012.01) |

(52) U.S. Cl.
CPC ............... *H04L 51/18* (2013.01); *G06F 8/42* (2013.01); *G06Q 10/0631* (2013.01); *G06Q 10/105* (2013.01)

(58) Field of Classification Search
CPC .... G06Q 10/105; G06Q 10/0631; G06F 8/42; H04L 51/18; H04L 51/046; H04L 51/24; H04L 51/02
USPC .................................................. 705/1.1–912
See application file for complete search history.

(56) References Cited

U.S. PATENT DOCUMENTS

| 8,250,192 B2* | 8/2012 | Bowerman ........... G06F 15/173 709/223 |
|---|---|---|
| 9,396,232 B1* | 7/2016 | Kapoor ............. G06F 16/24564 |
| 2007/0061266 A1* | 3/2007 | Moore .................... G06F 19/00 705/51 |
| 2009/0064280 A1* | 3/2009 | Babeanu ................ G06Q 10/06 726/3 |
| 2014/0280370 A1* | 9/2014 | Oberle ...................... G06F 8/51 707/803 |

(Continued)

OTHER PUBLICATIONS

Singh, Shelly, "How HR Tech Leaders can Use AI to Enhance Employee Experience," Business Word, Athena Information Solutions Pvt. Ltd., Oct. 13, 2017. (Year: 2017).*

(Continued)

*Primary Examiner* — Jonathan P Ouellette
(74) *Attorney, Agent, or Firm* — Yee & Associates, P.C.

(57) ABSTRACT

A method, computer system, and computer program product digitally manipulate a human resources workflow on a mobile device. The computer system identifies a mobile context of a chat message received from a mobile application executing on the mobile device. The computer system determines a human resources operation intended by the chat message. The determination is based in part on the mobile context. The computer system identifies a business rule corresponding to the human resources operation. The business rule comprises a plurality of linked metadata objects forming a syntax tree. The computer system interprets the plurality of metadata objects to implement the business rule within the mobile context. The computer system performs the human resources operation according to the business rule.

21 Claims, 12 Drawing Sheets

(56) References Cited

U.S. PATENT DOCUMENTS

| | | | |
|---|---|---|---|
| 2014/0351352 A1* | 11/2014 | Degaugue | G06Q 30/0613 |
| | | | 709/206 |
| 2016/0062753 A1* | 3/2016 | Champagne | G06F 8/51 |
| | | | 717/137 |
| 2018/0157721 A1* | 6/2018 | Khaitan | G06F 16/9535 |
| 2019/0073197 A1* | 3/2019 | Collins | G06F 3/0486 |
| 2019/0215283 A1* | 7/2019 | Nahum | G06F 3/16 |
| 2019/0236134 A1* | 8/2019 | Galitsky | G06F 16/35 |
| 2019/0268288 A1* | 8/2019 | Chandra | H04L 51/02 |
| 2019/0303873 A1 | 10/2019 | Bidadi et al. | |

OTHER PUBLICATIONS

Final Office Action, dated Sep. 14, 2020, regarding U.S. Appl. No. 15/940,836, 16 pages.

Office Action, dated Jul. 23, 2020, regarding U.S. Appl. No. 15/940,836, 16 pages.

* cited by examiner

CONTEXT AWARE METADATA-BASED CHAT WIZARD

BACKGROUND INFORMATION

1. Field

The present disclosure relates to improving the speed of operation of a computer by using a metadata-based human resources management system which avoids using a compiler to generate executable code.

2. Background

Increasingly, businesses rely on business rule interpreters to conduct Internet-based business, or to generate browser-based software programs for others to use in the conduct of business. However, such programs can be complex and can be undesirably slow to compile and/or execute in real-time, especially on a web browser when communication with a remote computer is desirable or necessary. Thus, solutions for increasing the speed of operation of a computer to create and execute business rules are desirable.

SUMMARY

The illustrative embodiments provide for a method for digitally performing a human resources operation on a mobile device. A first illustrative embodiment provides a computer system that identifies a mobile context of a chat message received from a mobile application executing on the mobile device. The computer system determines a human resources operation intended by the chat message. The determination is based in part on the mobile context. The computer system identifies a business rule corresponding to the human resources operation. The business rule comprises a plurality of linked metadata objects forming a syntax tree. The computer system interprets the plurality of metadata objects to implement the business rule within the mobile context. The computer system performs the human resources operation according to the business rule.

The illustrative embodiments also contemplate a computer configured to execute program code which implements this method. The illustrative embodiments also contemplate a non-transitory computer-recordable storage medium storing program code, which, when executed, implements this method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
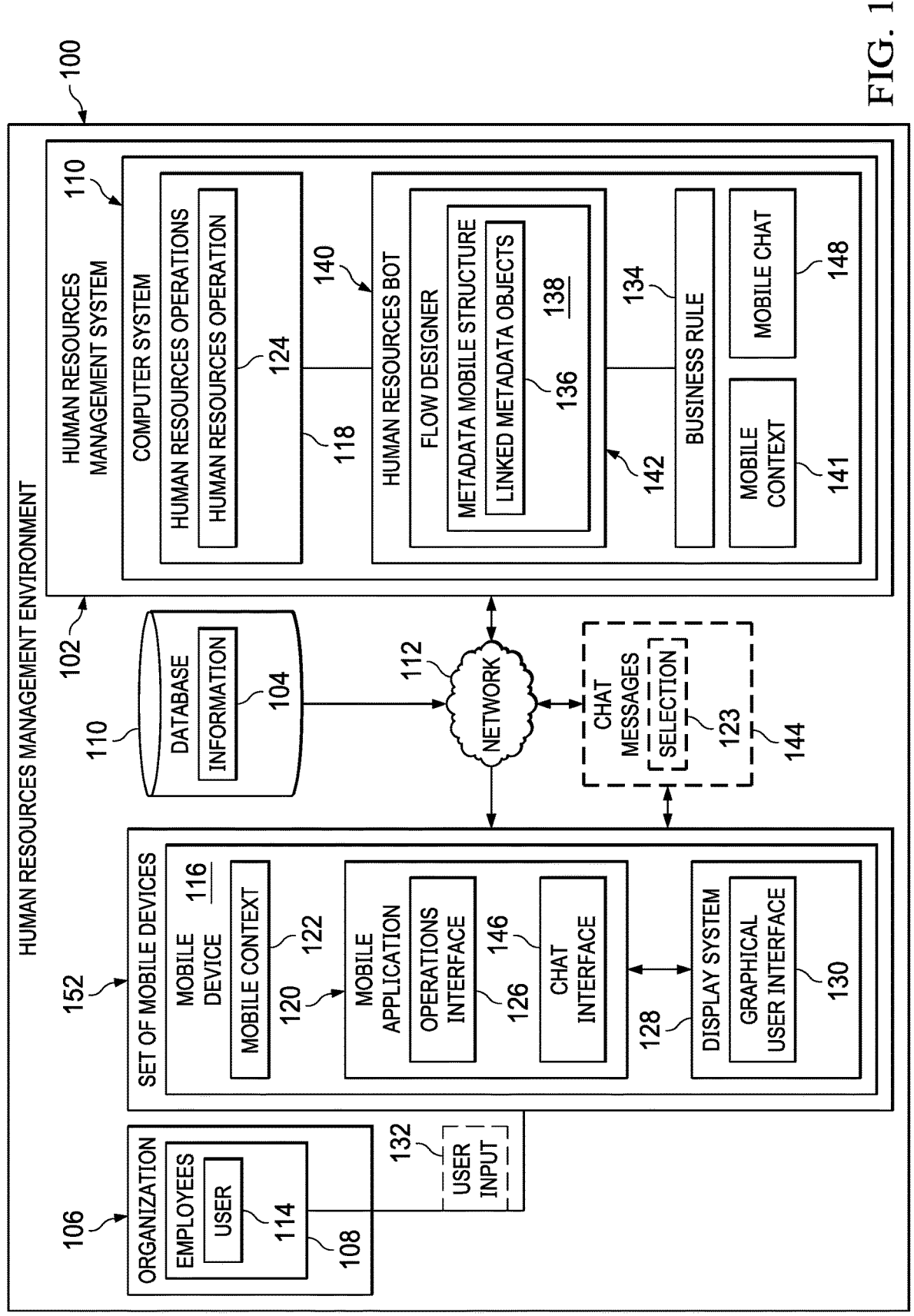
FIG. 1 is an illustration of a block diagram of a human resources management environment depicted in accordance with an illustrative embodiment.

The illustrative embodiments recognize and take into account that current human resource systems are undesirably slow in terms of assembling, compiling, and/or executing business rules for the performance of human resource operations. As used herein, a "business rule" is computer code executable only by a computer to produce a change in a computer, a server computer, at a remote client computer, or at a local client computer based on input from a server computer. While the term "computer rule" could be substituted for "business rule," it is customary in the business world to refer to computer rules that are used to aid in electronic services used in support of the business as "business rules." Thus, the term "business rule" should not be interpreted as a human-implemented procedure in a business environment, but rather strictly as an information technology implementation of hardware or software, as defined above.

As used herein, a "business rule interpreter" is hardware or software which is used to interpret or execute business rules in a business system. Typically, a "business rule interpreter" is software residing in a Web browser on the client computer. However, the illustrative embodiments are not necessarily limited to only client computers or Web browsers.

The illustrative embodiments contemplate that many different business rule system architectures and business rule interpreters are possible. The illustrative embodiments provide for business rule systems which dramatically increase the speed of the operation of computers implementing business rules.

Thus, the illustrative embodiments provide for a business rule interpreter designed for a domain-specific language entirely composed of metadata objects. The business rule interpreter of the illustrative embodiments may take the form of an abstract syntax tree interpreter having a structure composed of metadata itself. The abstract syntax tree interpreter requires no compiler because the constructs from which a metadata object is composed of are well-defined when they are constructed. Thus, the compilation phase that precedes the execution of code under ordinary circumstances is non-existent and hence avoided. The tokenization and parsing that would occur become the translation of the user input into the well-defined metadata objects that result in the composition of the user-selected block types and properties. As a result, executable code is not necessary.

In design, the business rule interpreter of the illustrative embodiments may be defined as a set of composable executor functions, each of which defines a single, atomic code construct as defined by the behavior belonging to the business rule domain-specific language. The atomic code constructs may be blocks visually presented to a user on a browser, which the user combines in an input area of a display monitor.

Combinations of these atomic code constructs generate combinations of executor functions, which the abstract syntax tree described above interprets and then implements in the browser. Hence compilation and executable code are entirely avoided, resulting in a dramatic increase in speed of the computer. The increase of speed has been measured to be ten times faster, or more, compared to prior business rule interpreters which rely on compilation, executable code, and runtime of that executable code.

The executor functions of the business rule interpreter all operate inside of a context defined at a beginning of the business rule execution step, which is the target object for all symbols in the course of a business rule execution as well as for all input to and output from the business rule itself. The different permutations of the compositions of these functions, as well as differentiated input, are what enable the execution of different business rule behaviors at runtime. In essence, the business rules of the illustrative embodiments execute from the abstract syntax tree interpreter from the runtime metadata definition of the business rule alone.

The illustrative embodiments also recognize and take into account that prior business rule systems were not as maintainable as desired and not as secure as desired, in addition to not being as fast as desired. The illustrative embodiments recognize and take into account that the illustrative embodiments increase security through the use of pre-defined executor functions defined by metadata. The illustrative embodiments also recognize and take into account that the illustrative embodiments are easily maintainable simply by defining additional executor functions, or by modifying the definitions of existing executor functions. Hence, the illustrative embodiments represent a highly significant improvement in the art of business system architectures.

Stated differently, the business rule interpreter of the illustrative embodiments is a code interpreter designed for a domain-specific language entirely composed of metadata objects. This compiler takes the form of an abstract syntax tree (AST) interpreter with the exception that the abstract syntax tree (AST) structure is the composed metadata itself. This structure requires no compilation because the constructs from which the metadata object are composed of are well-defined when they are constructed. So, the compilation phase that precedes the execution of code in the business rule interpreter is non-existent. The tokenization and parsing that would occur would be the translation of user input into well-defined metadata objects which would result in the composition of the user-selected block types and properties.

In design, the business rule interpreter is a set of infinitely-composable executor functions, each of which defines a single, atomic code construct as defined by the behavior (and actual visual "blocks") belonging to the business rule domain-specific language. These functions all operate inside of a context defined at the beginning of the business rule execution step which is the target object for all symbols defined in the course of the business rule execution, as well as for all input to and output from the business rule itself. The different permutations of the compositions of these functions, as well as differentiated input, are what enable the execution of the different business rule behaviors at runtime.

The architecture described in this document assumes conditions about the environment in which it is run, as well as the business decisions driving the platform in which it is used. The metadata passed into the business rule interpreter is dynamic. Thus, the single source of truth associated with the metadata provided to the interpreter is the actual metadata provided by the metadata document store. No pre-compilation has occurred on the metadata documents before they have been passed to the interpreter, including contextual overrides.

As indicated above, the illustrative embodiments use executor functions. The executor function is the basic unit of structure and function in the business rule interpreter. It is a singular code point which correlates to business rule metadata objects created by the business rule designer, which in turn is manipulated by the user to create desired business rules. An executor can represent as little code as possible to allow rules to be composed. All of the executors in the business rule interpreter take the context of the business rule currently in execution as well as a business rule metadata object entity for a single block inclusive of its children and returns the same context updated with the behavior of the executor itself.

The illustrative embodiments also use "helpers" to implement the business rule systems described herein. Helpers perform similar functionality to executors, executing JAVASCRIPT® against translated business rule metadata objects, with the exception that they do not necessarily take the same arguments or return the same values. All of the executors in the business rule interpreter take the context of the business rule currently in execution, as well as a business rule metadata object entity for a single block inclusive of its children and returns the same context updated with the behavior of the executor itself. Helpers always use a business rule execution context, as well as some other arguments, but not necessarily a business rule metadata object. They can return anything. The distinction between helpers and other utilities is that helpers use a business rule execution context or a business rule metadata object whereas the utility functions of executors are generic.

In the business rule systems of the illustrative embodiments, all date types may be transferrable. This fact implies that no matter what type of date identifier is passed, it will be coerced into the same JAVASCRIPT® date type.

In addition, the business rule interpreter accepts International Organization for Standardization (ISO) strings or epoch times as date-like type arguments. However, it assumes that these arguments are always in a universal format. One way to create a date from a business rule is with a "date-manipulation" with type of "create" and this operation will create a UTC date regardless of the time zone of the created date. The only exception to UTC handling of JAVASCRIPT® dates is in the "string-manipulation" block with a "format" type. This block will localize a date before formatting it to the specified format. The reason this procedure is done is that the executor is predominately creating "display" values.

Dates may be returned as International Organization for Standardization (ISO) strings. Output parameters that are of any of the date-like types or dates in notification messages will always be International Organization for Standardization (ISO) strings. If the value associated with an output parameter from a business rule of type "date," "datetime," or "time" happens to be an invalid date, it cannot be converted into an International Organization for Standardization (ISO) string and therefore will return a null value.

With reference now to the figures and, in particular, with reference to FIG. 1, a block diagram of a human resources management environment is depicted in accordance with an illustrative embodiment. As depicted, human resources management environment 100 includes human resources management system 102.

Human resources management system 102 may take different forms. For example, human resources management system 102 may be selected from one of an employee information system, a research information system, a sales information system, an accounting system, a payroll system, a human resources system, or some other type of information system that stores and provides access to information 104.

Information 104 can include information about organization 106. Information 104 may include, for example, at least one of information about people, products, research, product analysis, business plans, financials, or other information relating to organization 106 and employees 108. As depicted, information 104 is stored on database 110.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Organization 106 may be, for example, a corporation, a partnership, a charitable organization, a city, a government agency, or some other suitable type of organization. As depicted, organization 106 includes employees 108.

As depicted, employees 108 are people who are employed by or associated with organization 106. For example, employees 108 can include at least one of employees, administrators, managers, supervisors, and third parties associated with organization 106.

Human resources management system 102 may be implemented in computer system 110. Computer system 110 is a physical hardware system and includes one or more data processing systems. When more than one data processing system is present, those data processing systems may be in communication with each other using a communications medium. The communications medium may be a network, such as network 112. The data processing systems may be selected from at least one of a computer, a server computer, a workstation, a tablet computer, a laptop computer, a mobile phone, or some other suitable data processing system.

User 114 uses mobile device 116 to communicate with human resources management system 102 in order to perform one or more of human resource operations 118. Mobile device 116 and human resources management system 102 are connected to one another via network 112.

Network 112 is a communications medium and may include one or more wireless or wired data networks. Network 112 may include one or more of a wireless cellular data network, a local area network, a wide area network, the Internet, an intranet, or other suitable types of networks. For example, mobile device 116 may use a wireless cellular data network, such a code division multiple access (CDMA) or a global system for mobiles (GSM) to access the Internet. Human resources management system 102 may access the Internet via a wired link. In this manner, mobile device 116 is in communication with human resources management system 102 via network 112.

Mobile device 116 comprises physical hardware that is portable, such as a handheld device. For example, mobile device 116 includes at least one of a laptop computer, a tablet, a mobile phone, such as a cellular or smart phone, or any other suitable type of portable data processing system that can access information 104 over a network, such as network 112. The access may include at least one of reading, writing, modifying, or operating on information 104.

Mobile application 120 is configured to run on mobile device 116. Mobile application 120 may include at least one of a browser, a mobile application, or some other suitable type of application that is configured to receive and display information 104 and interact with user 114. User 114 may use mobile application 120 to perform one or more of human resource operations 118.

In one illustrative embodiment, mobile application 120 uses context data of mobile device 116 to influence the interactions between user 116 and mobile application 120. When mobile application 120 uses context data, mobile application 120 may be referred to as a "context-aware" application.

In one illustrative embodiment, user 114 may perform one or more of human resource operations 118 by digitally manipulating a human resources workflow on mobile device 116.

Mobile device 116 includes mobile context 122. Mobile context 122 is relevant data or information that influences the interaction of user 114 with mobile application 120. For example, mobile context 122 can include contextual data retrieved from user profiles stored on mobile device 116. Mobile context 122 can include historical and behavioral information about the user's previous interactions with mobile application 120. Mobile context 122 can include contextual data obtained through the various sensors of mobile device 116, including one or more cameras, microphones, gyroscopes, and accelerometers, as well as other relevant sensors. Mobile context 122 can include contextual data obtained from a GPS receiver or clock in mobile device 116.

Human resources management system 102 receives selection 123 of human resources operation 124 from mobile application 120 executing on mobile device 116. Human resources operation 124 is one of human resource operations 118. In one illustrative embodiment, human resources management system 102 identifies mobile context 122 based on one or more chat messages received from mobile device 116.

In one illustrative example, human resources management system 102 receives selection 123 based on interaction of user 114 with operations interface 126, displayed on display system 128 in graphical user interface 130. User 114 may interact with graphical user interface 130 through user input 132 generated by one or more user input device, such as, for example, a mouse, a keyboard, a trackball, a touchscreen, a stylus, or some other suitable type of input device.

Human resources management system 102 identifies business rule 134 corresponding to human resources operation 124.

In one illustrative example, human resources management system 102 enables human resources operation 124 through a plurality of linked metadata objects 136 organized into metadata mobile structure 138. Metadata mobile structure 138 is a tree representation of the abstract syntactic structure of source code, independent of any particular representation or encoding. Each node of the tree denotes a construct occurring in the source code. As opposed to parse trees, typically built by a parser during a source code translation and compiling process, metadata mobile structure 138 can be "abstract" in that it does not represent every detail appearing in the real syntax.

Human resource bot 140 interprets the plurality of linked metadata objects 136 to implement business rule 134 within mobile context 141 using mobile chat 134. Human resource bot 140 provides design time orchestration and runtime interpretation of metadata mobile structure 138 to implement business rule 134. In one illustrative example, human resource bot 140 includes logic for metadata retrieval, resolution, and interpretation, but not compilation.

In this illustrative example, human resource bot 140 also includes flow designer 142. Flow designer 142 allows a user to create and organize metadata objects into metadata mobile structure 138. Metadata objects created by flow designer 142 are manipulated by the user to create business rule 134. Metadata blocks, and the underlying executor functions, can represent as little code as possible to allow rules to be composed. All of linked metadata objects 136 take the context of business rule 134 currently in execution as well as mobile context 141 and returns the same context updated with the behavior of the executor itself.

Human resources bot 140 may be implemented in software, hardware, firmware, or a combination thereof. When software is used, the operations performed by human resources bot 140 may be implemented in program code configured to run on hardware, such as a processor unit. When firmware is used, the operations performed by human resources bot 140 may be implemented in program code and data and stored in persistent memory to run on a processor unit. When hardware is employed, the hardware may include circuits that operate to perform the operations in human resources bot 140.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, one or more of the plurality of linked metadata objects 136 may require user input 132 for implementing business rule 134. In this example, when interpreting the plurality of linked metadata objects 136, human resources bot 140 sends chat messages 144 to mobile device 116. In this example, chat messages 144 are a first set of messages that request input needed by one or more of the plurality of linked metadata objects 136 to implement business rule 134.

In one illustrative example, chat messages 144 can take the form of at least one of an icon or graphic within a graphical user interface, an e-mail, a chat message, or a short messaging service (SMS) message. According to an illustrative embodiment, chat messages 144 can be displayed within chat interface 146 of graphical user interface 130 of mobile device 116.

In one illustrative example, human resources bot 140 generates a first set of chat messages 144 according to a chat flow of metadata mobile structure 138 that corresponds to business rule 134. Human resources bot 140 interprets the plurality of linked metadata objects 136 to generate chat messages 144 according to metadata mobile structure 138.

In this illustrative example, human resources bot 140 interprets linked metadata objects 136 within mobile context 141. Human resources bot 140 uses mobile chat 148 to directly generate chat messages 144 requesting input needed by one or more of the plurality of linked metadata objects 136 to implement business rule 134. Mobile chat 148 is one or more metadata objects associated with at least one of linked metadata objects 136. Mobile chat 148 indicates that one or more chat messages 144 should be generated to implement business rule 134.

User 114 may interact with graphical user interface 130 through user input 132 to generate a second set of chat messages 144, providing user input 132 requested by human resources bot 140 using mobile chat 148. Human resources bot 140 receives the second set of chat messages 144 from mobile device 116, enabling the performance of human resources operation 124 according to business rule 134. Human resources bot 140 interprets information received in chat messages 144 within mobile context 141 identified from mobile context 122.

The illustrative example in FIG. 1 and the examples in the other subsequent figures provide one or more technical solutions to overcome a technical problem inherent in the time-consuming translation of metadata and compilation of executable code processes. By avoiding translation of metadata and compilation of executable code, the speed of both rule generation and rule execution is dramatically increased.

In this manner, the use of human resources bot 140 has a technical effect of increasing the speed of both the generation and execution of business rule 134 within mobile context 141. In this manner, human resources operation 124 performed for organization 106 may be performed more efficiently as compared to currently used systems that do not include human resources bot 140. For example, business rules and chat flows supporting the performance of operations such as, but not limited to, at least one of hiring, benefits administration, payroll, performance reviews, forming teams for new products, assigning research projects, or other suitable operations for organization 106, can be more quickly and accurately enabled when using human resources bot 140.

As a result, computer system 110 operates as a special purpose computer system in which human resources bot 140 in computer system 122 enables digitally performing human resources operation 124 on mobile device 116. Human resources bot 140 identifies mobile context 122 of chat messages 144 received from mobile application 120 executing on mobile device 116. Human resources bot 140 determines human resources operation 124 intended by chat message 144. The determination is based in part on mobile context 122. Human resources bot 140 identifies a logic flow for business rule 134 corresponding to human resources operation 124. Business rule 134 is comprised in a plurality of linked metadata objects 136 forming a syntax tree. Human resources bot 140 interprets the plurality of linked metadata objects 136 to implement business rule 134 within mobile context 122. Human resources bot 140 then performs human resources operation 124 within mobile context 122 according to business rule 134.

Thus, human resources bot 140 transforms computer system 110 into a special purpose computer system as compared to currently available general computer systems that do not have human resources bot 140. Human resources bot 140 performs business rules based on linked metadata objects 148 organized into metadata mobile structure 138 to implement human resources operation 124. Currently used general computer systems do not increase the speed of both rule generation and rule execution by avoiding translation of metadata and compilation of executable code.

Figure 2:
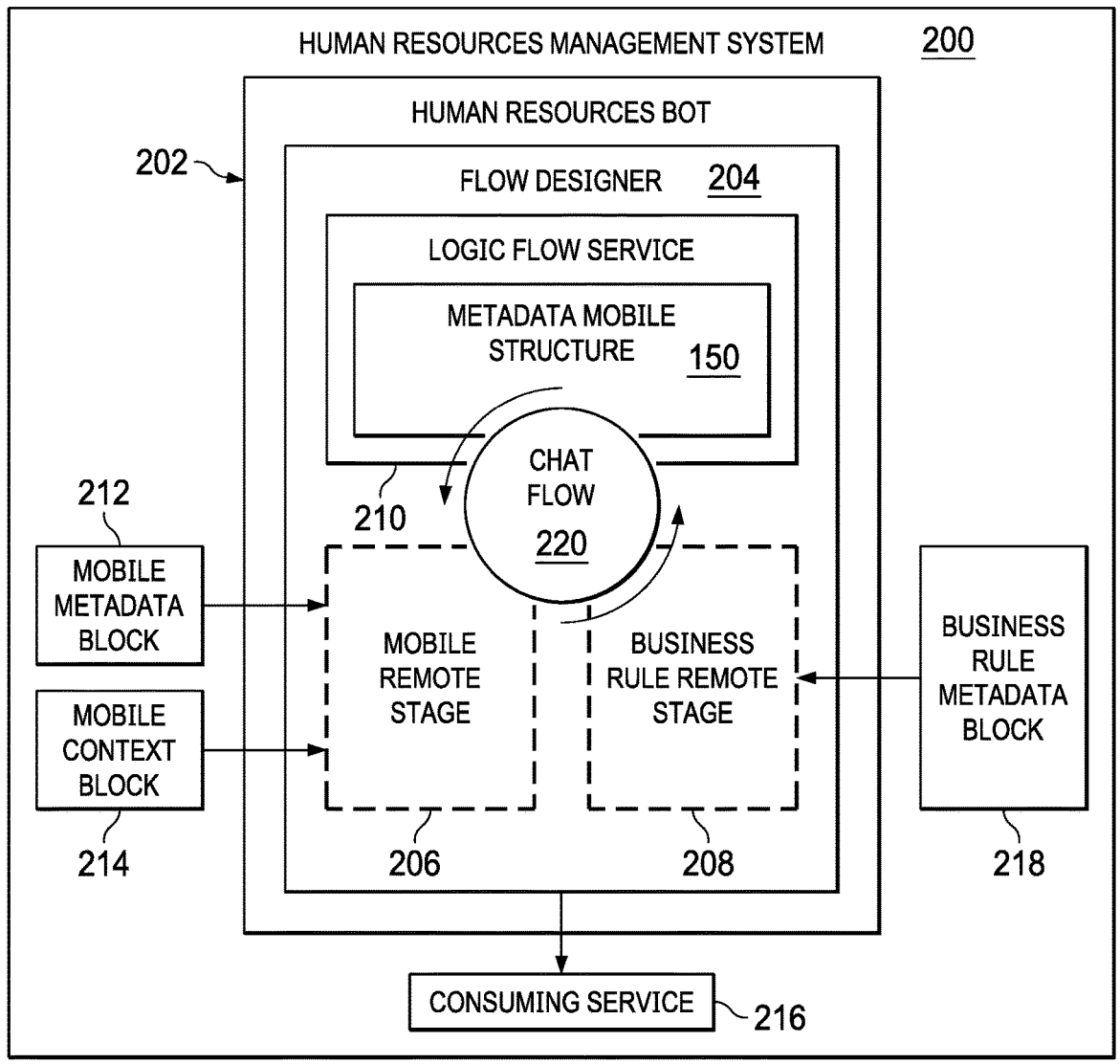
FIG. 2 is a block diagram of an architecture of a metadata-based human resources management system depicted in accordance with an illustrative embodiment.

FIG. 2 is a block diagram of an architecture of a metadata-based human resources management system depicted in accordance with an illustrative embodiment. Human resources management system 200 is an example of human resources management system 102 described in human resources management environment 100, and is presented as a network-based business system including both server computers and client computers.

Human resources management system 200 includes human resources bot 202. Human resources bot 202 is a server-side or node computer which presents flow designer 204. Flow designer 204 is a user interface (UI) that allows a user to combine blocks, each representing an executor function that is a pre-defined atomic unit of code. Human resources bot 202 may be where the interpreter fetches metadata. It is not necessarily a restful request, but may be any methodology used to provision the metadata used by the business rule interpreter, which is the primary function of mobile remote stage 206 and business rule remote stage 208. After the user has selected the desired atomic units of code, either alone or in combination, logic flow service 210 provides one or more context object identifications to mobile remote stage 206 and business rule remote stage 208, which can be a server-side computer. The identifications are the identifications against which metadata documents can be resolved.

Logic flow service 210 may be referred to as the engine inside the application. Human resources bot 202 may be a wrapper around the interpreter intended to separate the logic of metadata retrieval and resolution, not complication, but duplicating and caching, from the actual metadata interpretation. Logic flow service 210 interprets metadata blocks of metadata mobile structure 150 and generates chat output and business rule output therefrom.

Mobile remote stage 206 can be implemented as part of mobile chat 148 of FIG. 1. Mobile remote stage 206 is a program that allows communication between human resources bot 210 and mobile chat 148. Mobile remote stage 206 "exposes" some internal functions of mobile chat 148 to logic flow service 210 in a limited fashion. Mobile remote stage 206 enables human resources bot 202 to share data with mobile chat 148, and enables mobile chat 148 to take actions on behalf of human resources bot 202.

In this illustrative example, a user incorporates mobile metadata block 212 into metadata mobile structure 150 at design time. In this manner, mobile metadata block 212 provides additional context for execution of related metadata blocks inclusive of its children, and returns the same context updated with the information received through chat messages 144 of FIG. 1. In this illustrative example, mobile metadata block 212 may indicate chat flow 220 for requesting and receiving information required for execution of related blocks of metadata mobile structure 150.

In this illustrative example, a user incorporates mobile context block 214 into metadata mobile structure 150 at design time. In this manner, mobile context block 214 provides additional context for execution of related metadata blocks inclusive of its children based on mobile context information retrieved from a mobile device, such as mobile context 122 of mobile device 116 of FIG. 1. Mobile context block 214 returns the same context updated with the information received through chat messages 144 of FIG. 1. In this illustrative example, mobile context block 214 may indicate that mobile metadata block 212 should be interpreted in light of mobile context information retrieved from an associated mobile device.

Mobile remote stage 206 receives interpreted metadata provided from human resources bot 202. Mobile remote stage 206 generates chat output from the interpreted metadata. Chat output is the output provided by mobile chat 148 of FIG. 1 corresponding to the metadata and input values passed into mobile remote stage 206. Mobile chat 148 sends chat output to mobile device 116 as chat messages, such as chat messages 144 of FIG. 1.

Chat output is already executable because they are generated from the pre-determined atomic units of code specified by the executor functions selected client-side. Chat output is the output provided by human resources bot 202 to mobile remote stage 206 that corresponds to the interpreted metadata blocks of metadata mobile structure 150 as indicated by mobile metadata block 212.

Business rule remote stage 208 can be implemented as part of business rule 134 of FIG. 1. Business rule remote stage 208 is a program that allows communication between human resources bot 202 and consuming service 216. Business rule remote stage 208 "exposes" some internal functions of consuming service 216 to human resources bot 202 in a limited fashion. Business rule remote stage 208 enables human resources bot 202 to share data with consuming service 216, and enables consuming service 216 to take actions on behalf of, and using data provided by human resources bot 202.

Business rule remote stage 208 receives interpreted metadata provided from human resources bot 202. Business rule remote stage 208 generates business rule output from the interpreted metadata. Business rule output is the output provided by business rule 134 of FIG. 1 corresponding to the metadata and input values passed into business rule remote stage 208. Business rule 134 sends business rule output to consuming service 216, enabling consuming service 216 to perform human resources operation 124 of FIG. 1.

In this illustrative example, a user incorporates business rule metadata block 218 into metadata mobile structure 150. In this manner, business rule metadata block 218 provides additional context for execution of related metadata blocks inclusive of its children, and provides business rule output to consuming service 216.

Business rule output is already executable because they are generated from the pre-determined atomic units of code specified by the executor functions selected client-side. Business rule output is the output provided by human resources bot 202 to business rule remote stage 208 that corresponds to the interpreted metadata blocks of metadata mobile structure 150 as indicated by business rule metadata block 218.

Thus, business rule output is provided directly to one or more of consuming service 216, which executes the output of business rule remote stage 208. By avoiding translation of metadata and compilation of executable code, the speed of both rule generation and rule execution is dramatically increased.

Consuming service 216 represents a service for performing a human resource operation, such as human resource operation 124 of FIG. 1. Consuming service 216 can be a service that either requested that a business rule be executed, require output there from, or combinations thereof. Consuming service 216 can be, but is not necessarily restricted to, a mobile application, such as mobile application 120 of FIG. 1. In another illustrative example, consuming service 216 can be, but is not necessarily restricted to, a human resources application for performing a human resources operation, such as human resources operation 124 of FIG. 1. In one illustrative example, consuming service 216 can be implemented as a webpage.

Human resources management system 200 is a specific implementation of the illustrative embodiments. Thus, human resources management system 200 does not necessarily limit the claimed inventions, or other business rule systems described herein.

Figure 3:
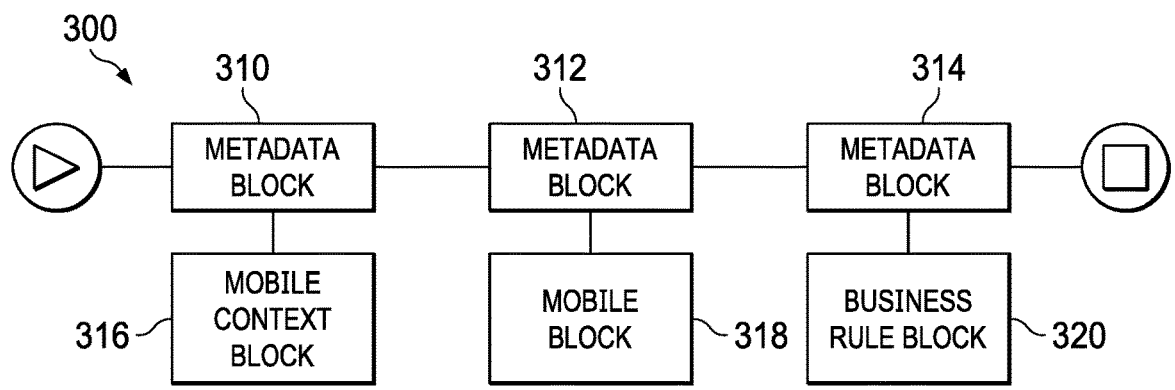
FIG. 3 is a block diagram of a metadata mobile structure depicted in accordance with an illustrative embodiment.

With reference next to FIG. 3, a block diagram of a metadata mobile structure is depicted in accordance with an illustrative embodiment. Metadata mobile structure 300 is an example of metadata mobile structure 150, shown in block form in FIG. 1.

Metadata mobile structure 300 includes metadata blocks 310, 312, and 314. Metadata blocks 310, 312, and 314 are metadata objects that can be manipulated within flow designer 204 of FIG. 2 to create desired business rules. Each of metadata blocks 310, 312, and 314 correlate to one or more executor functions, which in turn can be interpreted by logic flow service 210 of FIG. 2 for implementing the corresponding business rule. These functions all operate inside of a context defined at the beginning of the business rule execution step which is the target object for all symbols defined in the course of the business rule execution, as well as for all input to and output from the business rule itself. The different permutations of the compositions of these functions, as well as differentiated input, are what enable the execution of the different business rule behaviors at runtime.

Metadata mobile structure 300 further includes mobile context block 316. Mobile context block 316 is an example of mobile context block 214 of FIG. 2. Mobile context block 316 provides additional context for execution of related metadata block 310. Specifically, mobile context block 316 may indicate metadata block 310, as well as child metadata blocks 312 and 314 thereof, should be interpreted within a mobile context retrieved from associated mobile device, such as mobile context 122 of mobile device 116, both shown in block form in FIG. 1.

Metadata mobile structure 300 further includes mobile block 318. Mobile block 318 is an example of mobile metadata block 212 of FIG. 2. Mobile block 318 provides additional context for execution of related mobile metadata block 312. Specifically, mobile block 318 may indicate a chat flow, such as chat flow 220 of FIG. 2, for requesting and receiving information required for execution of mobile metadata block 312. Mobile block 318 requests and returns the same context updated with the information received through chat messages 144 of FIG. 1, as provided through mobile remote stage 206.

Metadata mobile structure 300 further includes business rule block 320. Business rule block 320 is an example of business rule metadata block 218 of FIG. 2. Business rule block 318 provides additional context for execution of related metadata block 314. Specifically, business rule block 320 may indicate a consuming service for receipt of business rule output provided by related metadata block 314. Business rule block 320 requests and returns information to a consuming service, such as consuming service 216 in FIG. 2, as provided through business rule remote stage 208.

Figure 4:
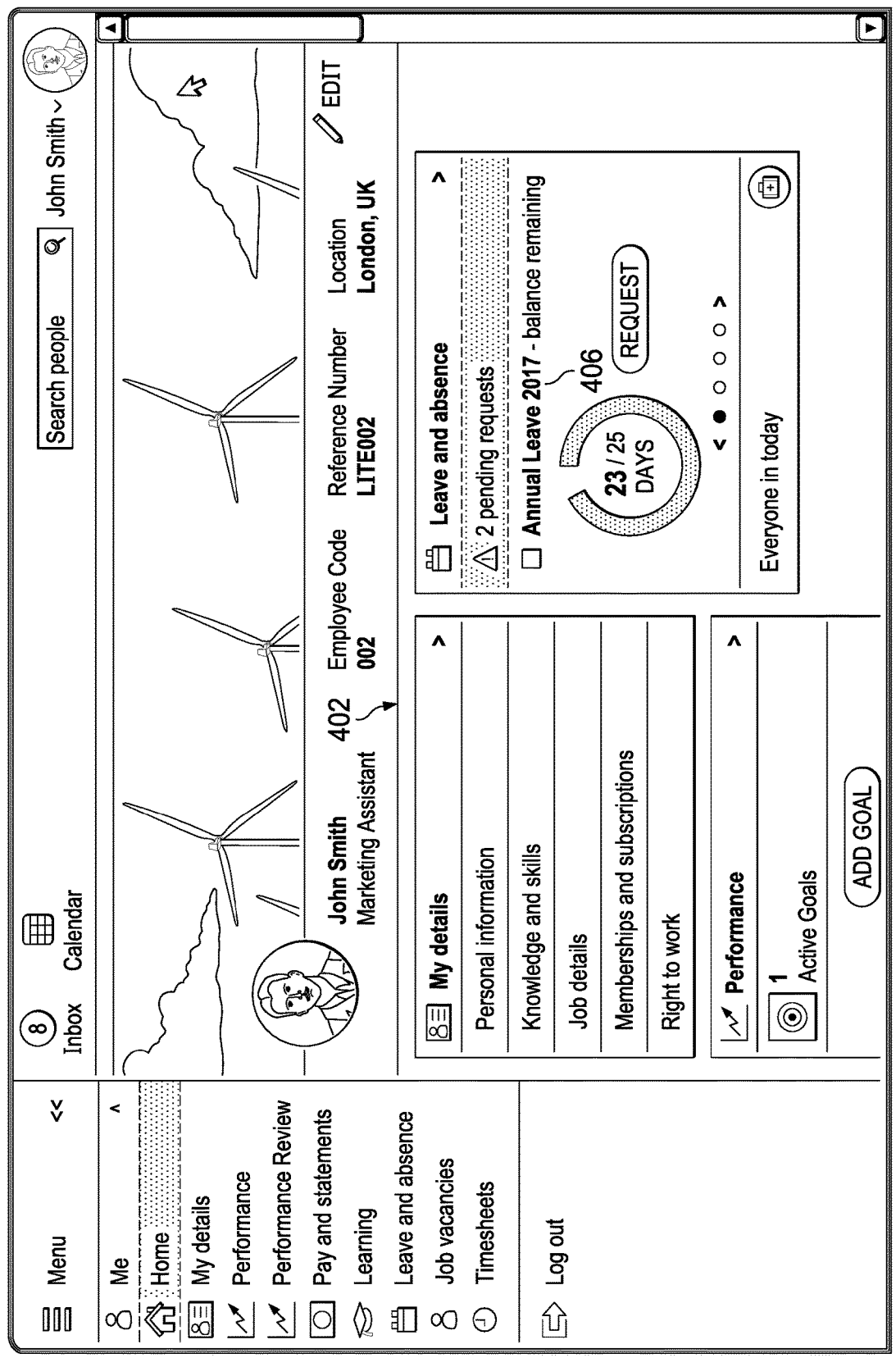
FIG. 4 is an illustration of a graphical user interface in accordance with an illustrative embodiment.

With reference now to FIG. 4, an illustration of a graphical user interface is depicted in accordance with an illustrative embodiment. Graphical user interface 400 is an example of a graphical user interface 130 shown in block form in FIG. 1.

As depicted, graphical user interface 400 displays operations interface 402 for mobile application 404. Operations interface 402 is an example of operations interface 126, shown in block form in FIG. 1. Operations interface 402 allows a user to select or search for different human resources operations that are supported by and can be performed using a mobile application. A selection, such as selection 122 of FIG. 1, is generated when a user interacts with one of the various graphical elements in graphical user interface 400, selecting commonly utilized or frequently accessed human resource operations.

In this illustrative example, operations interface 402 includes a graphical element indicating annual leave 406 for an employee of an organization. As depicted, annual leave 406 indicates that the employee has 23 days remaining of 25 days of annual leave.

With reference next to FIGS. 5-16, a sequential series of chat messages in the context of a vacation planning human resources operation is depicted in accordance with an illustrative embodiment. Chat interface 500 is an example of chat interface 146, shown in block form in FIG. 1.

Figure 5:
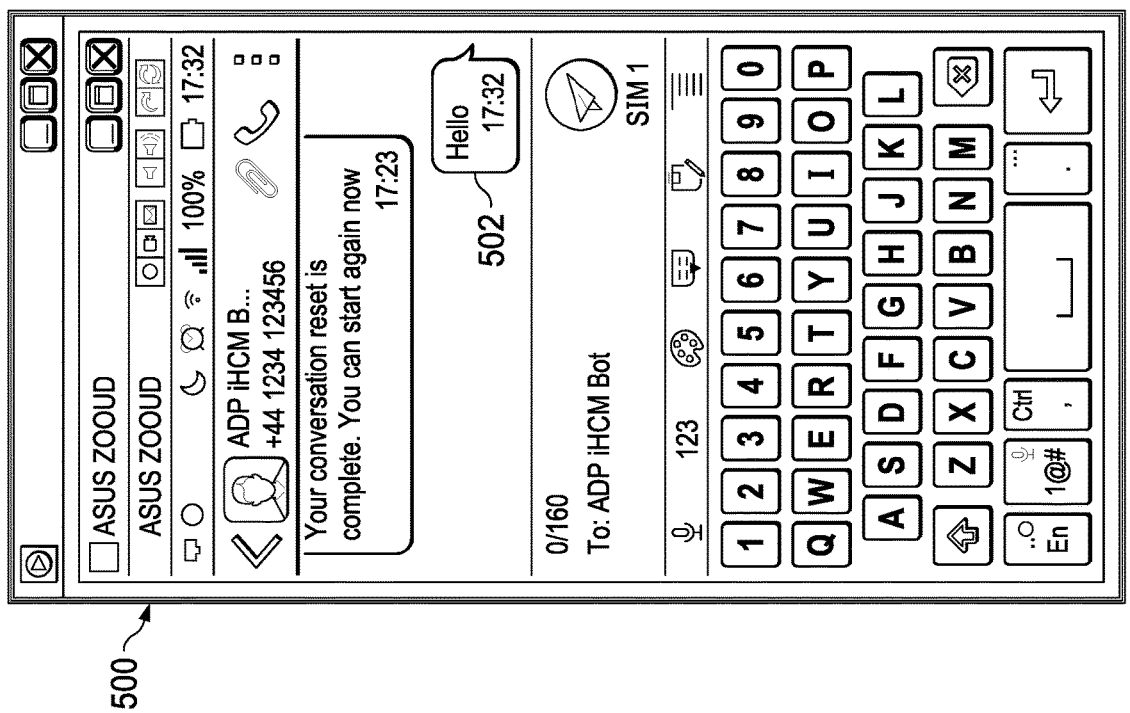
FIGS. 5-16 are a sequential series of chat messages in a context of a vacation planning human resources operation in accordance with an illustrative embodiment.

Referring now specifically to FIG. 5, chat message 502 is displayed in chat interface 500. Chat message 502 is a chat message, such as chat messages 144 of FIG. 1, sent from a user to a human resources bot, such as human resources bot 140, shown in block form in FIG. 1. In this illustrative example, chat message 502 begins an interaction with a human resources bot to perform the human resources operation.

Figure 6:
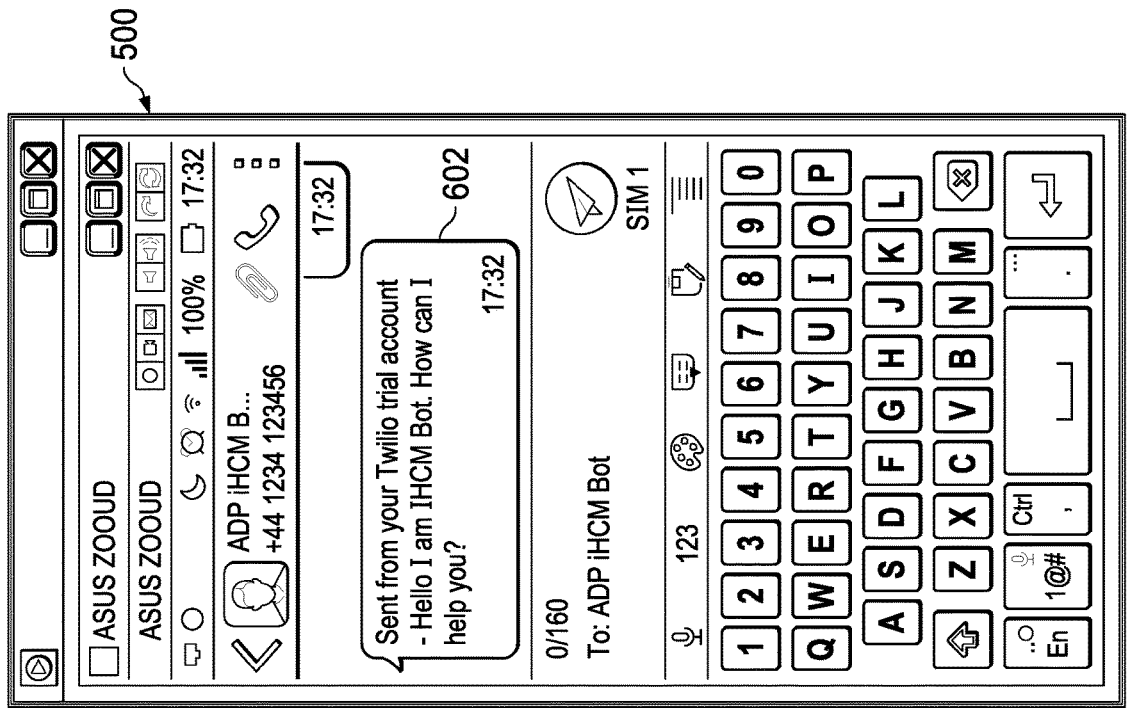

Referring now to FIG. 6, chat interface 500 further includes chat message 602. A human resources bot generates and sends chat message 602 in response to receiving chat message 502.

Figure 7:
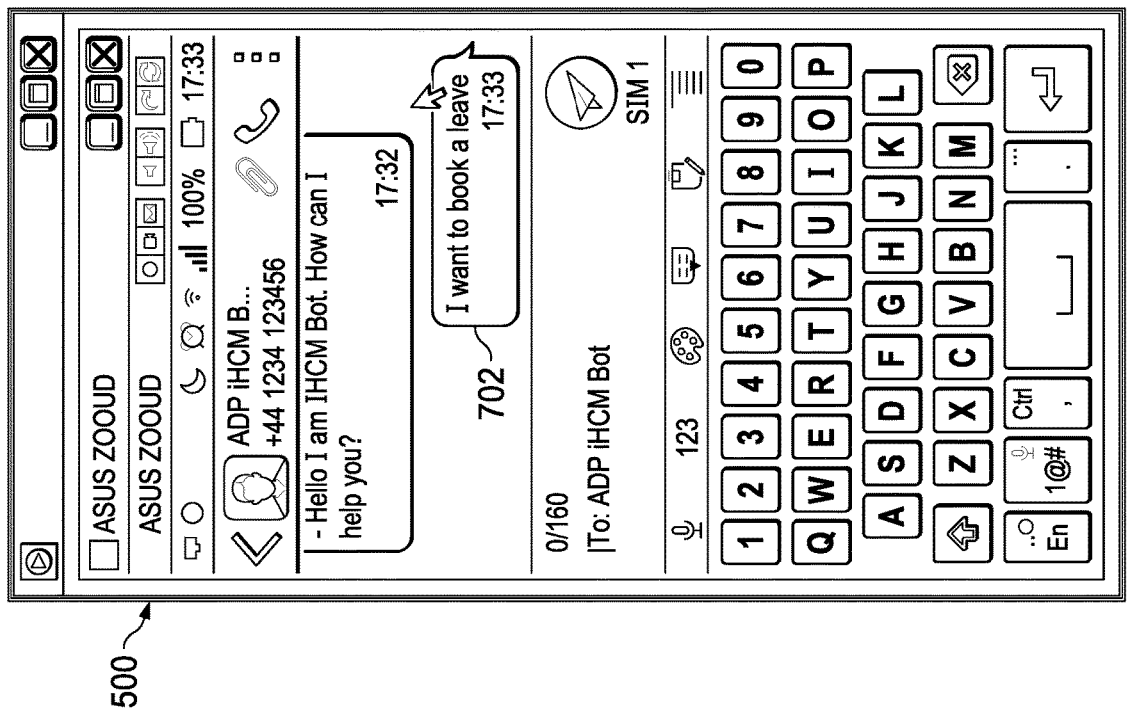

Referring now to FIG. 7, chat interface 500 further includes chat message 702. The user has entered chat message 702, indicating an intent to "book a leave."

Figure 8:
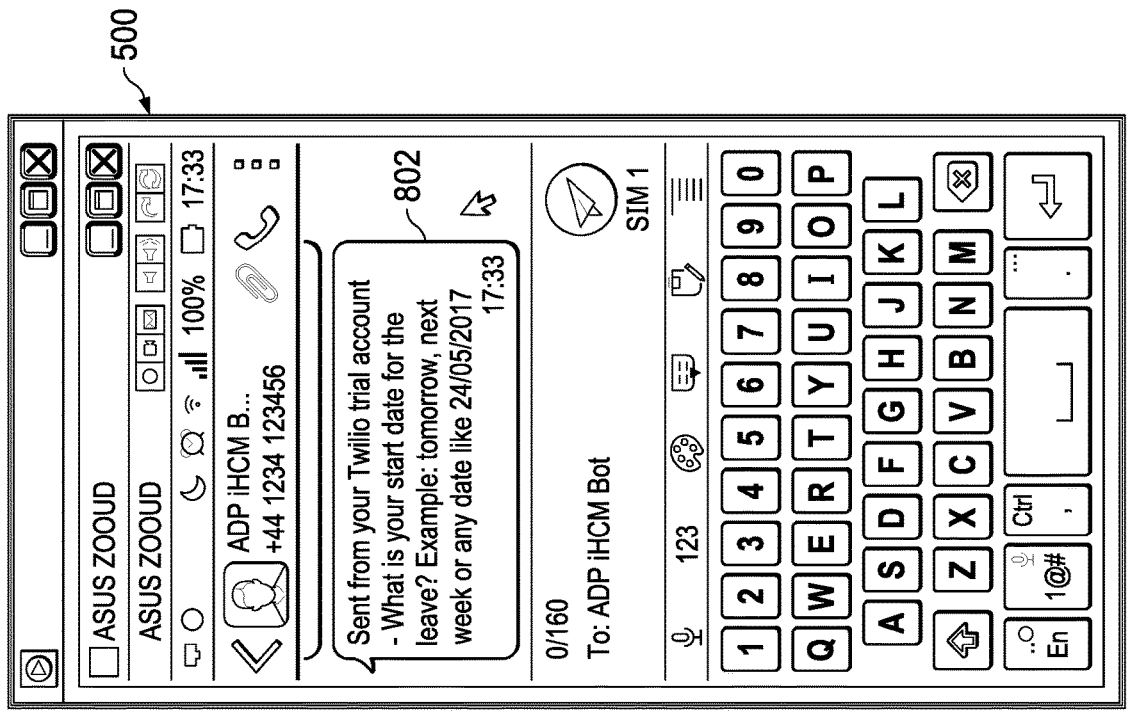

Referring now specifically to FIG. 8, chat interface 500 additionally displays chat message 802 in response to receiving chat message 702, wherein a human resources bot determines an intent of chat message 702. The human resources bot identifies a corresponding business rule and flow design based in part on the identified intent and mobile context of information received with chat message 702. In response to receiving chat message 702, the human resources bot returns chat message 802. Chat message 802 can be interpreted from the identified flow design.

In this illustrative example, a human resources bot, such as human resources bot 140 of FIG. 1, interprets a metadata mobile structure within the mobile context identified from the received chat messages. Therefore, in generating chat message 802, the human resources bot can apply various rules and formats within the identified mobile context to influence the presentation of the chat messages as well as the application of the corresponding business rule. In this illustrative example, chat message 802 requests information required for interpretation of an associated metadata block within the identified mobile context, such as metadata block 312 of FIG. 3.

Figure 9:
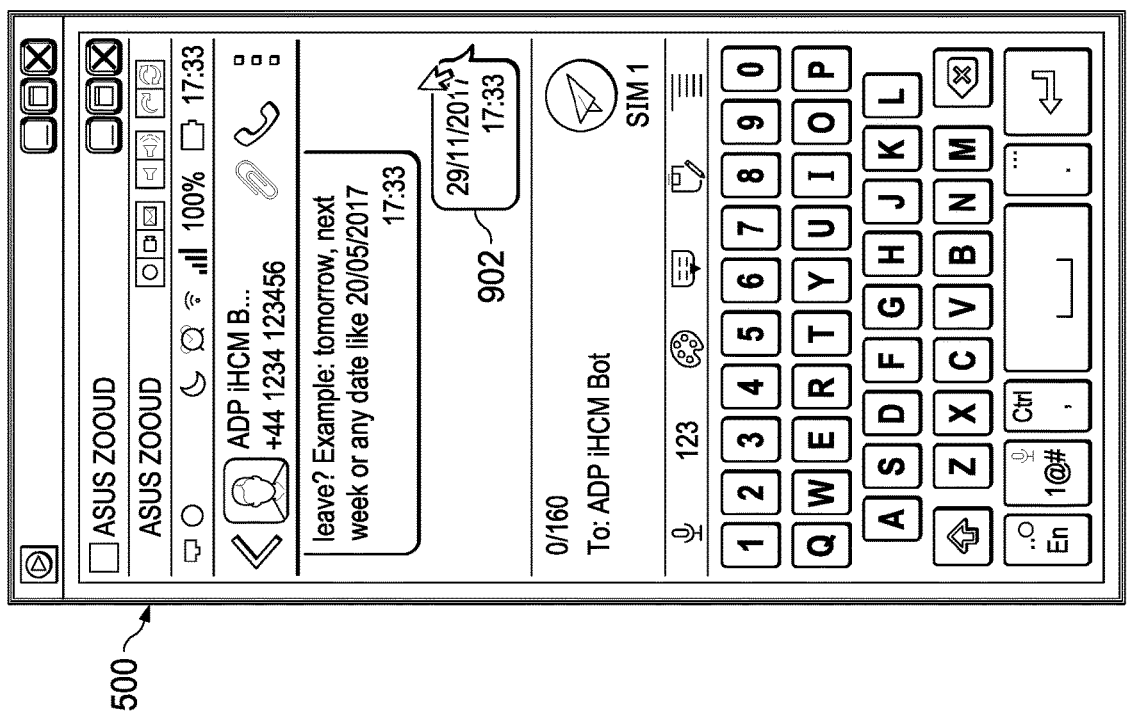

Referring specifically to FIG. 9, chat interface 500 additionally displays chat message 902. The user has entered chat message 902 in response to a prompt for information indicated in chat message 802.

Figure 10:
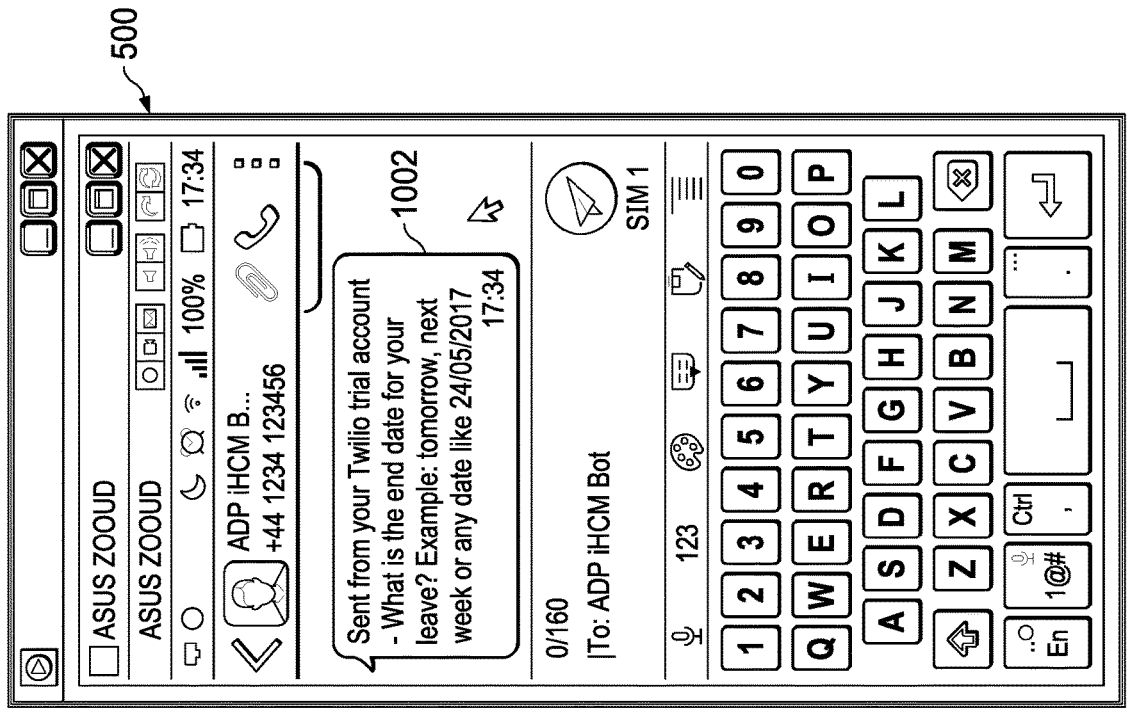

Referring now specifically to FIG. 10, chat interface 500 additionally displays chat message 1002 in response to receiving chat message 902. The human resources bot continues with interpretation of the identified metadata mobile structure within the mobile context of information received with the chat messages. In response to receiving chat message 902, the human resources bot returns chat message 1002. In this illustrative example, chat message 1002 requests information required for interpretation of an associated metadata block within the identified mobile context, such as metadata block 312 of FIG. 3.

Figure 11:
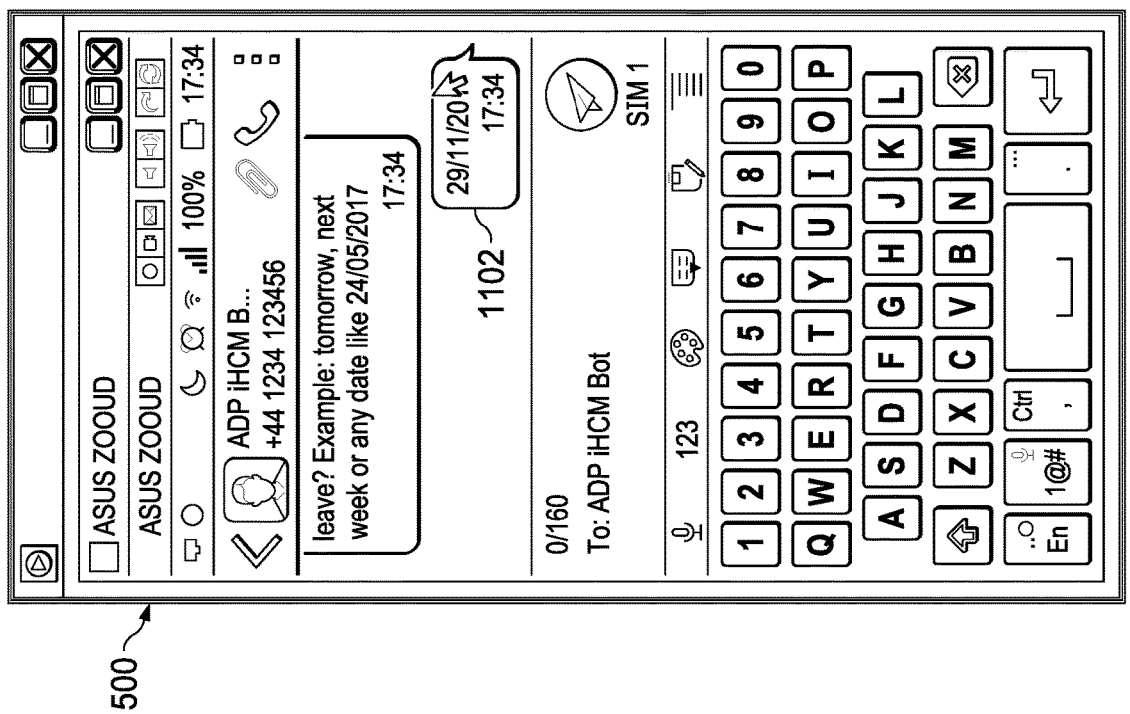

Referring specifically to FIG. 11, chat interface 500 additionally displays chat message 1102. The user has entered chat message 1102 in response to a prompt for information indicated in chat message 1002. In this illustrative example, chat message 1102 provides information required for interpretation of an associated metadata block within the identified mobile context, such as metadata block 312.

Figure 12:
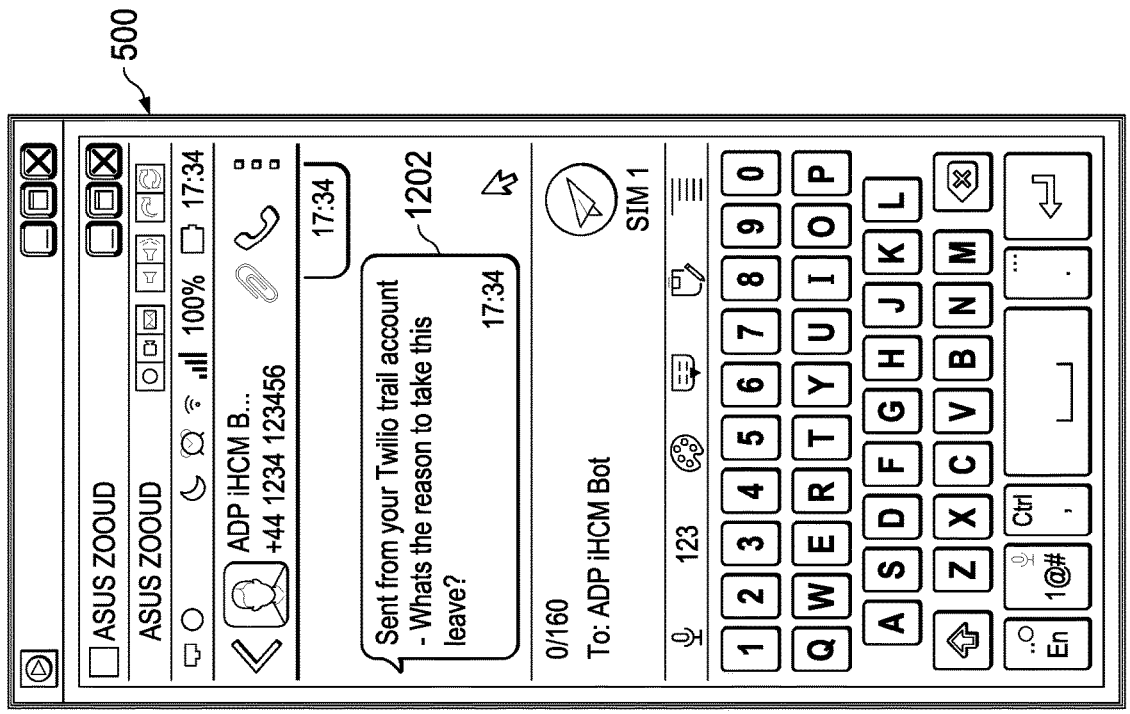

Referring now specifically to FIG. 12, chat interface 500 additionally displays chat message 1202 in response to receiving chat message 1102. The human resources bot continues with interpretation of the identified metadata mobile structure within the mobile context of information received with the chat messages. In response to receiving chat message 1102, the human resources bot returns chat message 1202. In this illustrative example, chat message 1202 requests information required for interpretation of an associated metadata block within the identified mobile context, such as metadata block 312.

Figure 13:
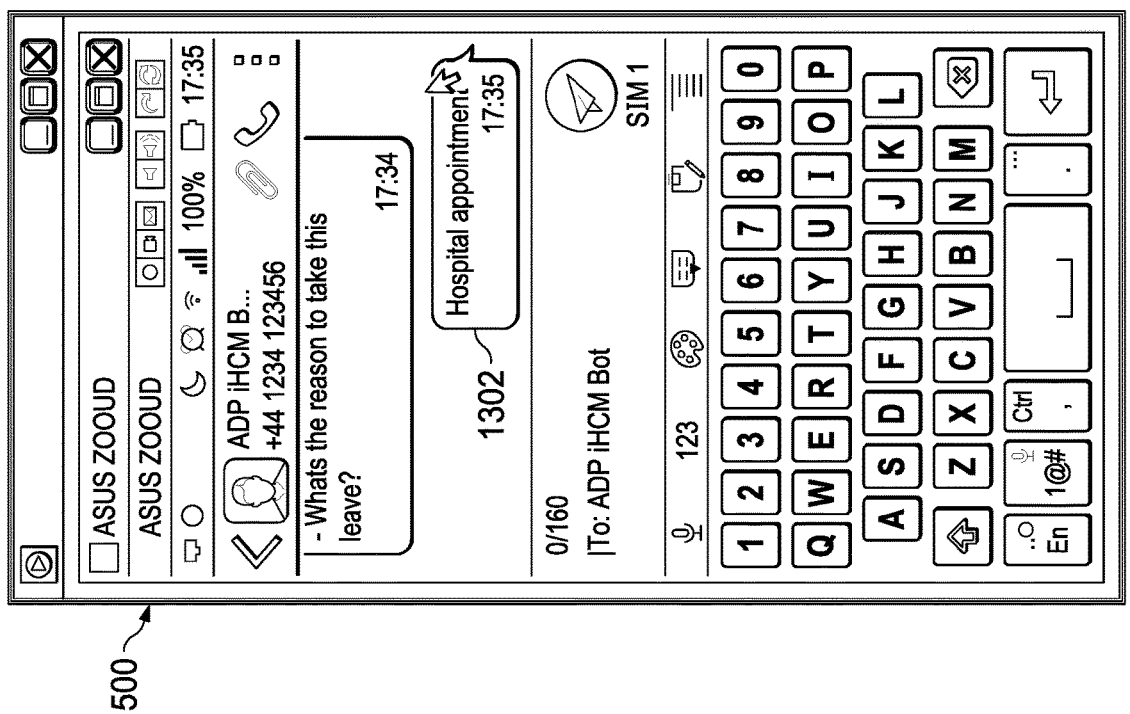

Referring specifically to FIG. 13, chat interface 500 additionally displays chat message 1302. The user has entered chat message 1302 in response to a prompt for information indicated in chat message 1202. In this illustrative example, chat message 1302 provides information required for interpretation of an associated metadata block within the identified mobile context, such as metadata block 312.

Figure 14:
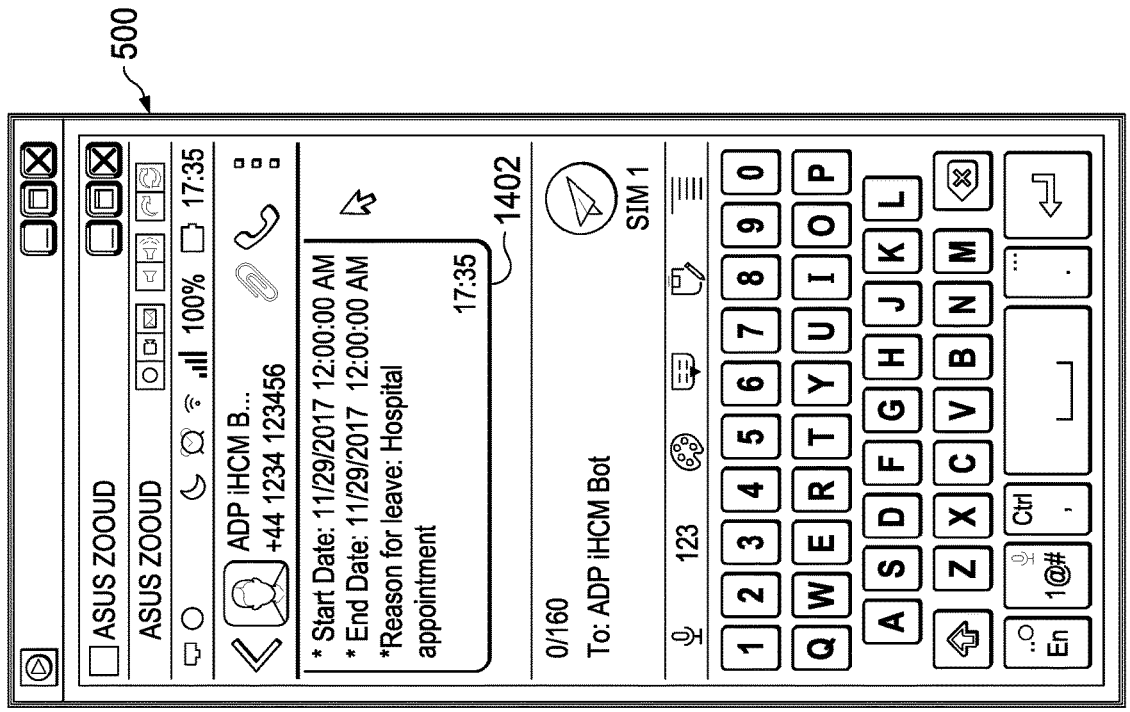

Referring now specifically to FIG. 14, chat interface 500 additionally displays chat message 1402 in response to receiving chat message 1302. In this illustrative example, the human resources bot has received all information required for interpretation of the identified metadata mobile structure within the mobile context of information received with the chat messages. In response to receiving chat message 1302, the human resources bot returns chat message 1402. In this illustrative example, chat message 1402 presents a summary of information that will be passed to a corresponding consuming service for the performance of the human resources operation.

Figure 15:
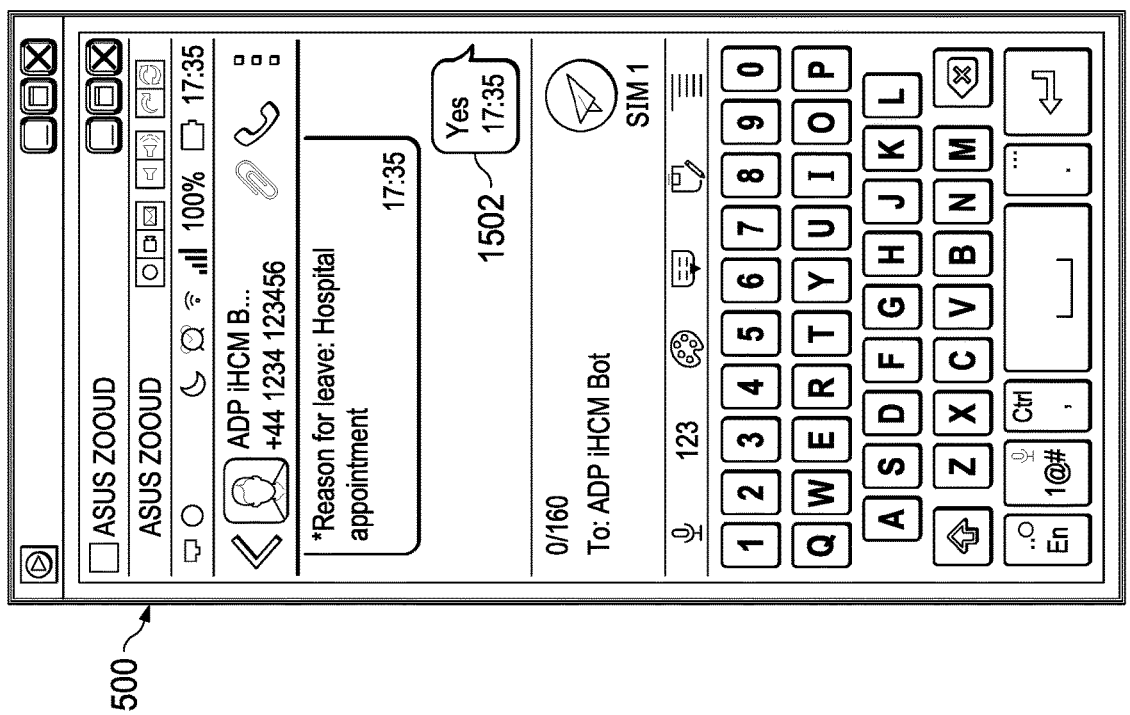

Referring specifically to FIG. 15, chat interface 500 additionally displays chat message 1502. The user has entered chat message 1502 in response to the information summary indicated in chat message 1402. In this illustrative example, chat message 1502 confirms the information summarized in chat message 1402.

Figure 16:
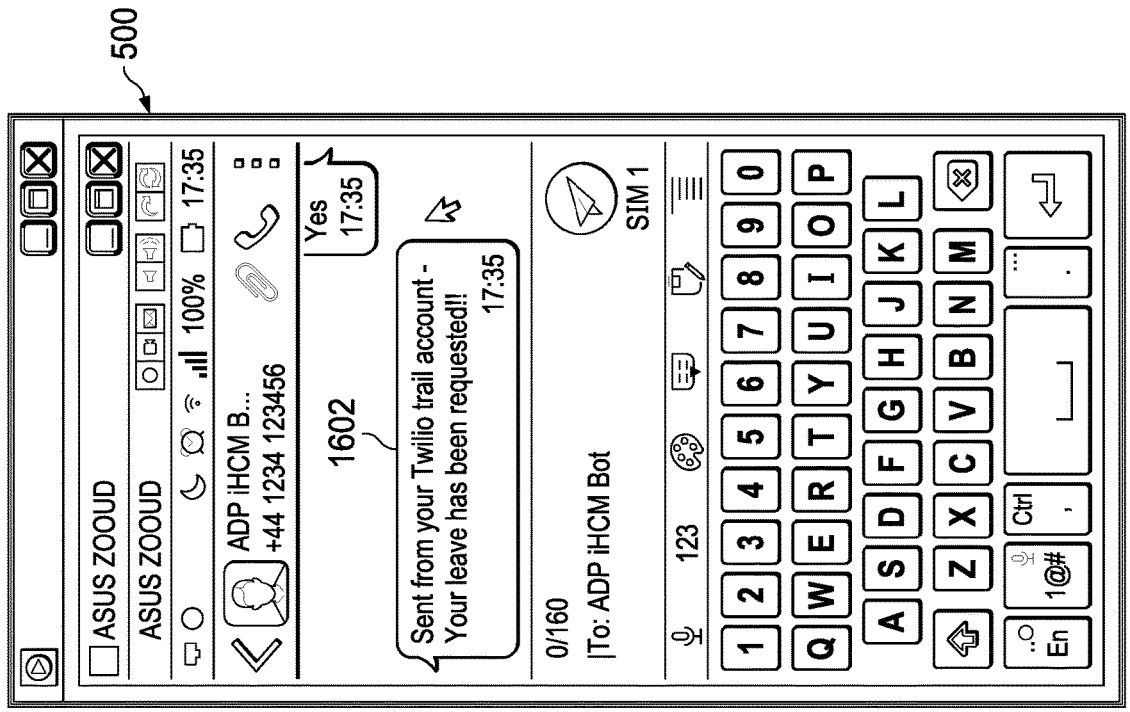

Referring now specifically to FIG. 16, chat interface 500 additionally displays chat message 1602. In response to receiving chat message 1502, the human resources bot passes the identified information into a corresponding consuming service, such as consuming service 216 of FIG. 2. Upon performance of the human resources operation by the consuming service, the human resources bot generates chat message 1602 and forwards the message to the user.

Figure 17:
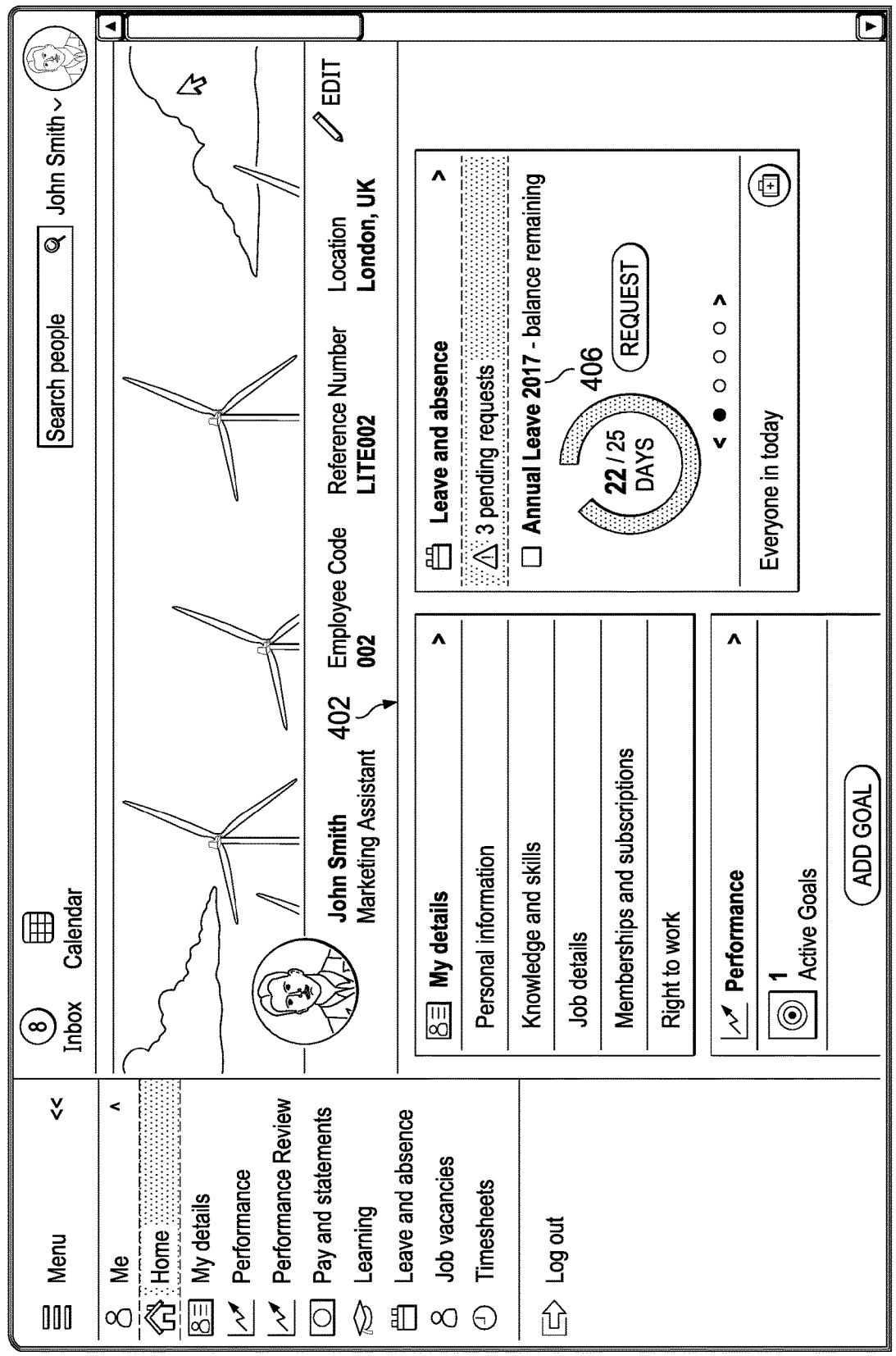
FIG. 17 is a second illustration of a graphical user interface in accordance with an illustrative embodiment.

With reference now to FIG. 17, a second illustration of a graphical user interface is depicted in accordance with an illustrative embodiment. As depicted, graphical user interface 400 is illustrated after the performance of a human resources operation as performed by a human resources bot according to the chat flow illustrated in FIGS. 5-16.

As depicted, operations interface 402 includes a graphical element indicating annual leave 406 for an employee of an organization. Annual leave 406 has been updated to reflect the human resource operation performed according to the chat flow illustrated in FIGS. 5-16. As depicted, annual leave 406 indicates that the employee now has 22 days remaining of 25 days of annual leave.

Figure 18:
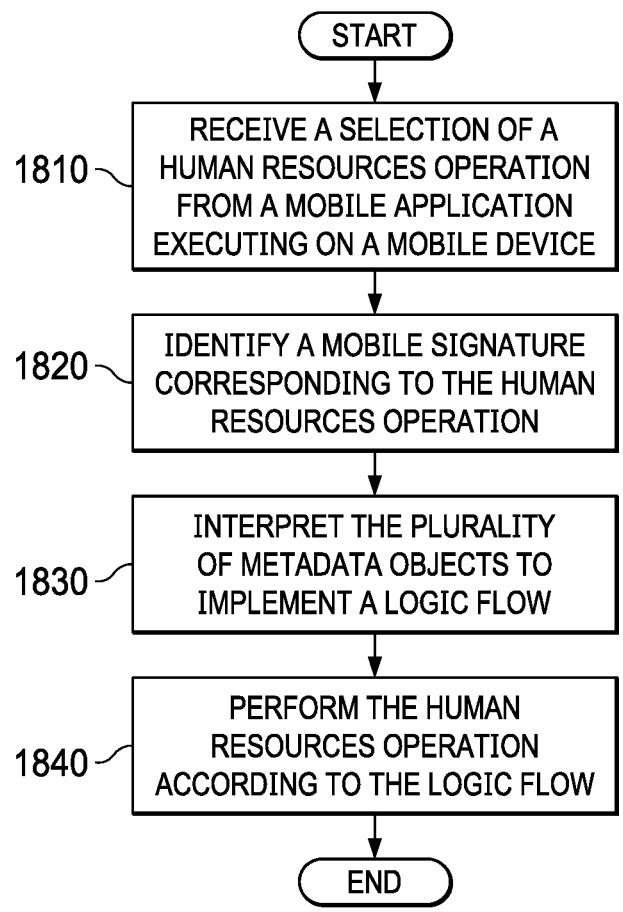
FIG. 18 is a flowchart of a process for digitally manipulating a human resources workflow on a mobile device in accordance with an illustrative embodiment.

With reference next to FIG. 18, a flowchart of a process for digitally manipulating a human resources workflow on a mobile device is depicted in accordance with an illustrative embodiment. Process 1800 may be implemented in computer system 110 of FIG. 1. For example, process 1800 may be implemented as operations performed by business rule client 138, shown in block form in FIG. 1.

The process begins by receiving a selection of a human resources operation from a mobile application executing on a mobile device (step 1810). The selection can be, for example, selection 132 of human resources operations 118 selected from operations interface 126, all shown in FIG. 1.

The process then identifies a logic flow with a mobile signature corresponding to the human resources operation (step 1820). The business rule comprises a plurality of linked metadata objects forming a syntax tree.

The process then interprets the plurality of metadata objects to implement the logic flow (step 1830). Interpreting the plurality of metadata objects comprises sending, to the mobile device, a first set of chat messages that request input for the plurality of metadata objects. Interpreting the plurality of metadata objects further comprises receiving a second set of chat messages from the mobile device that provide the requested input. The first set of chat messages and the second set of chat messages can be, for example, chat messages 144 of FIG. 1.

The process then performs the human resources operation according to the logic flow (step 1840), with the process terminating thereafter. Performing the human resources operation comprises generating a workflow stage notification. Performing the human resources operation further comprises publishing the workflow stage notification to a set of mobile devices for display on a timeline of the mobile application.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 19:
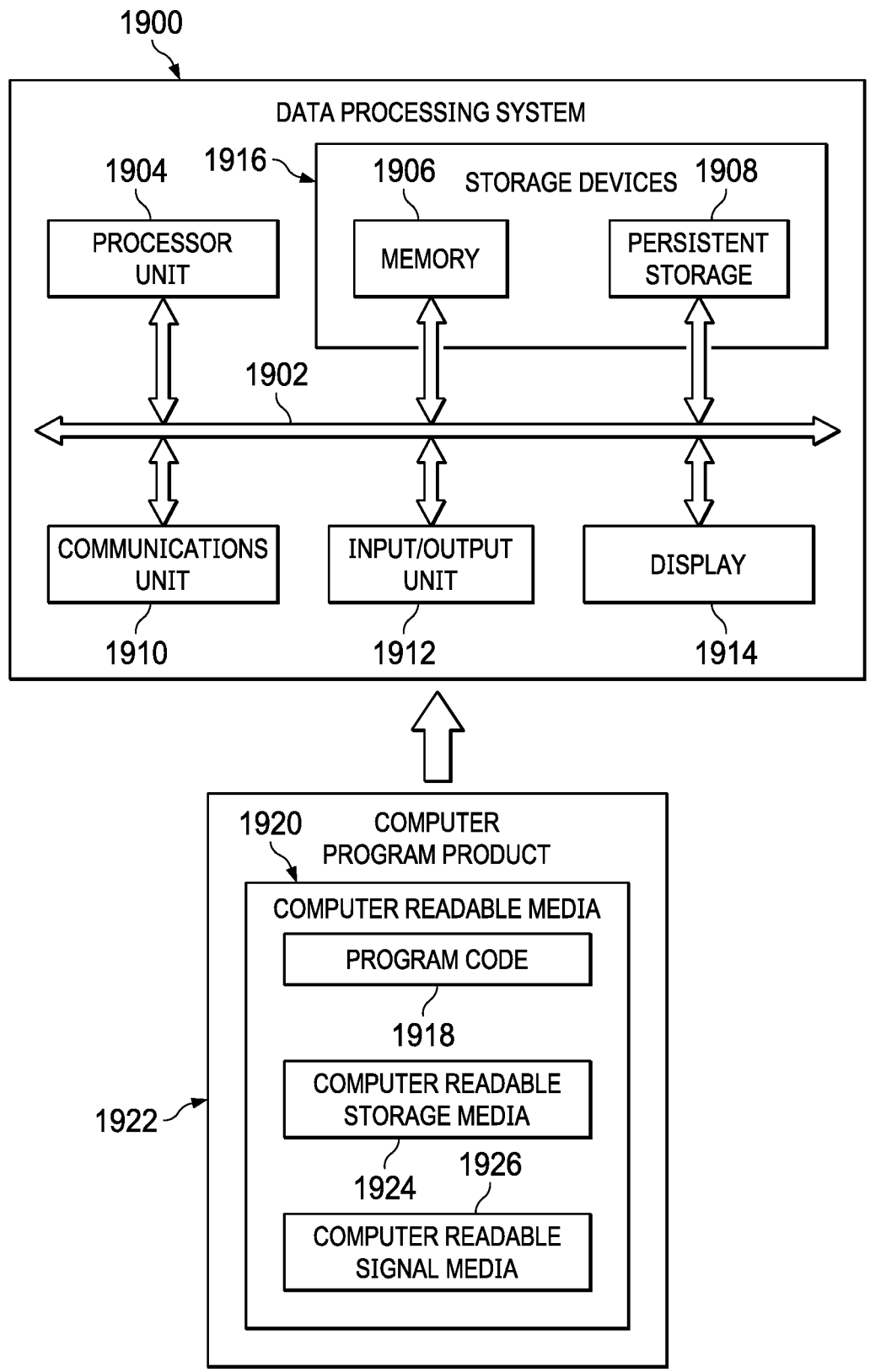
FIG. 19 is a block diagram of a data processing system depicted in accordance with an illustrative embodiment.

Turning now to FIG. 19, an illustration of a block diagram of a data processing system is depicted in accordance with an illustrative embodiment. Data processing system 1900 may be used to implement one or more computers and computer system 122 in FIG. 1. In this illustrative example, data processing system 1900 includes communications framework 1902, which provides communications between processor unit 1904, memory 1914, persistent storage 1916, communications unit 1908, input/output unit 1910, and display 1912. In this example, communications framework 1902 may take the form of a bus system.

Processor unit 1904 serves to execute instructions for software that may be loaded into memory 1914. Processor unit 1904 may be a number of processors, a multi-processor core, or some other type of processor, depending on the particular implementation.

Memory 1914 and persistent storage 1916 are examples of storage devices 1906. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1906 may also be referred to as computer-readable storage devices in these illustrative examples. Memory 1914, in these examples, may be, for example, a random access memory or any other suitable volatile or non-volatile storage device. Persistent storage 1916 may take various forms, depending on the particular implementation.

For example, persistent storage 1916 may contain one or more components or devices. For example, persistent storage 1916 may be a hard drive, a flash memory, a rewritable optical disk, a rewritable magnetic tape, or some combination of the above. The media used by persistent storage 1916 also may be removable. For example, a removable hard drive may be used for persistent storage 1916.

Communications unit 1908, in these illustrative examples, provides for communications with other data processing systems or devices. In these illustrative examples, communications unit 1908 is a network interface card.

Input/output unit 1910 allows for input and output of data with other devices that may be connected to data processing system 1900. For example, input/output unit 1910 may provide a connection for user input through at least of a keyboard, a mouse, or some other suitable input device. Further, input/output unit 1910 may send output to a printer. Display 1912 provides a mechanism to display information to a user.

Instructions for at least one of the operating system, applications, or programs may be located in storage devices 1906, which are in communication with processor unit 1904 through communications framework 1902. The processes of the different embodiments may be performed by processor unit 1904 using computer-implemented instructions, which may be located in a memory, such as memory 1914.

These instructions are referred to as program code, computer-usable program code, or computer-readable program code that may be read and executed by a processor in processor unit 1904. The program code in the different embodiments may be embodied on different physical or computer-readable storage media, such as memory 1914 or persistent storage 1916.

Program code 1918 is located in a functional form on computer-readable media 1920 that is selectively removable and may be loaded onto or transferred to data processing system 1900 for execution by processor unit 1904. Program code 1918 and computer-readable media 1920 form computer program product 1922 in these illustrative examples.

In one example, computer-readable media 920 may be computer-readable storage media 1924 or computer-readable signal media 1926.

In these illustrative examples, computer-readable storage media 1924 is a physical or tangible storage device used to store program code 1918 rather than a medium that propagates or transmits program code 1918. Alternatively, program code 1918 may be transferred to data processing system 1900 using computer-readable signal media 1926.

Computer-readable signal media 1926 may be, for example, a propagated data signal containing program code 1918. For example, computer-readable signal media 1926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1900 are not meant to provide architectural limitations to the manner in which different embodiments may be implemented. The different illustrative embodiments may be implemented in a data processing system including components in addition to or in place of those illustrated for data processing system 1900. Other components shown in FIG. 19 can be varied from the illustrative examples shown. The different embodiments may be implemented using any hardware device or system capable of running program code 1918.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for digitally performing a human resources operation on a mobile device, the method comprising:
   identifying, by a computer system, a mobile context of a chat message received from a mobile application executing on the mobile device;
   determining, by the computer system, a human resources operation intended by the chat message, wherein the determination is based in part on the mobile context;
   identifying, by the computer system, a business rule corresponding to the human resources operation, wherein the business rule comprises a plurality of linked metadata objects forming an abstract syntax tree interpreter;
   interpreting, by the computer system, the plurality of linked metadata objects to implement the business rule within the mobile context;

performing, by the computer system, the human resources operation according to the business rule;

identifying a chat flow corresponding to the human resources operation, wherein the chat flow comprises a set of associated metadata objects linked to the abstract syntax tree interpreter;

interpreting the set of associated metadata objects to generate the first set of chat messages;

parsing, by the computer system, the plurality of linked metadata objects within the mobile context; and dynamically generating, by the computer system, the abstract syntax tree interpreter from the plurality of linked metadata objects.

2. The method of claim 1, wherein interpreting the plurality of linked metadata objects comprises:

sending, by the computer system, a first set of chat messages to the mobile device, wherein the first set of chat messages request input for the plurality of linked metadata objects; and receiving, by the computer system, a second set of chat messages generated by a graphical user interface from the mobile device that provide a requested input.

3. The method of claim 2, wherein performing the human resources operation comprises:

generating, by the computer system, a notification about the human resources operation to a user; and updating, by the computer system, a human resources profile of the user to reflect the human resources operation.

4. The method of claim 1, wherein performing the human resources operation comprises:

generating, by the computer system, a notification about the human resources operation to a user; and updating, by the computer system, a human resources profile of the user to reflect the human resources operation.

5. The method of claim 1, wherein the business rule is implemented inside of the mobile context determined from the chat message and defined at a beginning of an interpretation step for the plurality of linked metadata objects, wherein the mobile context is a target object for all symbols defined in a course of implementing the business rule, as well as for all input to and output from the business rule.

6. The method of claim 5, wherein interpreting the plurality of linked metadata objects further comprises:

entering the requested input into the abstract syntax tree interpreter, wherein a compiler operation to generate computer code for implementing the business rule is avoided, and wherein executing the abstract syntax tree interpreter produces a result without using executable code to achieve the result.

7. The method of claim 1, wherein interpreting the plurality of linked metadata objects further comprises:

generating an output for the business rule within the mobile context; and wherein performing the human resources operation further comprises:

providing the output to a consuming service for performing the human resources operation according to the business rule within the mobile context.

8. A computer system comprising:

a hardware processor; and a human resources bot in communication with the hardware processor, wherein the human resources bot is configured:

to identify a mobile context of a chat message received from a mobile application executing on a mobile device;

to determine a human resources operation intended by the chat message, wherein the determination is based in part on the mobile context;

to identify a business rule corresponding to the human resources operation, wherein the business rule comprises a plurality of linked metadata objects forming an abstract syntax tree interpreter;

to interpret the plurality of linked metadata objects to implement the business rule within the mobile context; and to perform the human resources operation according to the business rule, wherein the human resources bot is further configured:

to identify a chat flow corresponding to the human resources operation, wherein the chat flow comprises a set of associated metadata objects linked to the abstract syntax tree interpreter; and to interpret the set of associated metadata objects to generate the first set of chat messages, wherein the human resources bot is further configured:

to parse the plurality of linked metadata objects within the mobile context and to dynamically generate the abstract syntax tree interpreter from the plurality of linked metadata objects.

9. The computer system of claim 8, wherein in interpreting the plurality of linked metadata objects, the human resources bot is further configured:

to send a first set of chat messages to the mobile device, wherein the first set of chat messages request input for the plurality of linked metadata objects; and to receive a second set of chat messages generated by a graphical user interface from the mobile device that provide a requested input.

10. The computer system of claim 9, wherein in performing the human resources operation, the human resources bot is further configured:

to generate a notification about the human resources operation to a user; and to update a human resources profile of the user to reflect the human resources operation.

11. The computer system of claim 8, wherein in performing the human resources operation, the human resources bot is further configured:

to generate a notification about the human resources operation to a user; and to update a human resources profile of the user to reflect the human resources operation.

12. The computer system of claim 8, wherein the business rule is implemented inside of the mobile context determined from the chat message and defined at a beginning of an interpretation step for the plurality of linked metadata objects, wherein the mobile context is a target object for all symbols defined in a course of implementing the business rule, as well as for all input to and output from the business rule.

13. The computer system of claim 12, wherein in interpreting the plurality of linked metadata objects, the human resources bot is further configured:

to enter the requested input into the abstract syntax tree interpreter, wherein a compiler operation to generate computer code for implementing the business rule is avoided, and wherein executing the abstract syntax tree interpreter produces a result without using executable code to achieve the result.

14. The computer system of claim 8, wherein in interpreting the plurality of linked metadata objects the human resources bot is further configured:
to generate an output for the business rule within the mobile context; and
wherein in performing the human resources operation the human resources bot is further configured:
to provide the output to a consuming service for performing the human resources operation according to the business rule within the mobile context.

15. A computer program product for digitally performing a human resources operation on a mobile device, the computer program product comprising:
a computer readable storage media;
program code, stored on the computer readable storage media, for identifying a mobile context of a chat message received from a mobile application executing on the mobile device;
program code, stored on the computer readable storage media, for determining a human resources operation intended by the chat message, wherein the determination is based in part on the mobile context;
program code, stored on the computer readable storage media, for identifying a business rule corresponding to the human resources operation, wherein the business rule comprises a plurality of linked metadata objects forming an abstract syntax tree interpreter;
program code, stored on the computer readable storage media, for interpreting the plurality of linked metadata objects to implement the business rule within the mobile context;
program code, stored on the computer readable storage media, for performing the human resources operation according to the business rule;
program code, stored on the computer readable storage media, for identifying a chat flow corresponding to the human resources operation, wherein the chat flow comprises a set of associated metadata objects linked to the abstract syntax tree interpreter;
program code, stored on the computer readable storage media, for interpreting the set of associated metadata objects to generate the first set of chat messages program code, stored on the computer readable storage media, for parsing the plurality of linked metadata objects within the mobile context; and
program code, stored on the computer readable storage media, for dynamically generating, the abstract syntax tree interpreter from the plurality of linked metadata objects.

16. The computer program product of claim 15, wherein the program code for interpreting the plurality of linked metadata objects comprises:
program code, stored on the computer readable storage media, for sending a first set of chat messages to the mobile device, wherein the first set of chat messages request input for the plurality of linked metadata objects; and
program code, stored on the computer readable storage media, for receiving a second set of chat messages generated by a graphical user interface from the mobile device that provide a requested input.

17. The computer program product of claim 16, wherein the program code for performing the human resources operation comprises:
program code, stored on the computer readable storage media, for generating a workflow stage notification to a user; and
program code, stored on the computer readable storage media, for updating a human resources profile of the user to reflect the human resources operation.

18. The computer program product of claim 15, wherein the program code for performing the human resources operation comprises:
program code, stored on the computer readable storage media, for generating a workflow stage notification to a user; and
program code, stored on the computer readable storage media, for updating a human resources profile of the user to reflect the human resources operation.

19. The computer program product of claim 15, wherein the business rule is implemented inside of the mobile context determined from the chat message and defined at a beginning of an interpretation step for the plurality of linked metadata objects, wherein the mobile context is a target object for all symbols defined in a course of implementing the business rule, as well as for all input to and output from the business rule.

20. The computer program product of claim 19, wherein program code for interpreting the plurality of linked metadata objects further comprises:
program code, stored on the computer readable storage media, for entering the the requested input into the abstract syntax tree interpreter, wherein a compiler operation to generate computer code for implementing the business rule is avoided, and wherein executing the abstract syntax tree interpreter produces a result without using executable code to achieve the result.

21. The computer program product of claim 15, wherein the program code for interpreting the plurality of linked metadata objects further comprises:
program code, stored on the computer readable storage media, for generating an output for the business rule within the mobile context; and
wherein the program code for performing the human resources operation further comprises:
program code, stored on the computer readable storage media, for providing the output to a consuming service for performing the human resources operation according to the business rule within the mobile context.

* * * * *